Figure 1:
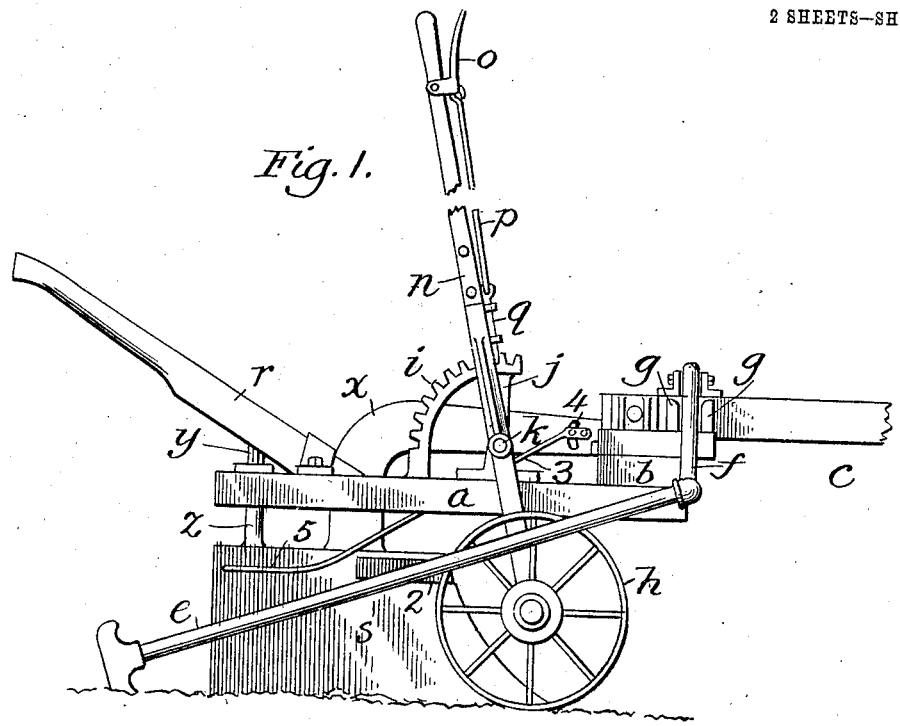

No. 832,989. PATENTED OCT. 9, 1906.
C. F. MacNAIR.
PLOW.
APPLICATION FILED OCT. 19, 1905.

2 SHEETS—SHEET 1.

WITNESSES:
James F. Duhamel
M. Hamilton

INVENTOR
Charles F. MacNair
BY his ATTORNEY
James Hamilton

No. 832,989. PATENTED OCT. 9, 1906.
C. F. MacNAIR.
PLOW.
APPLICATION FILED OCT. 19, 1905.
2 SHEETS—SHEET 2.
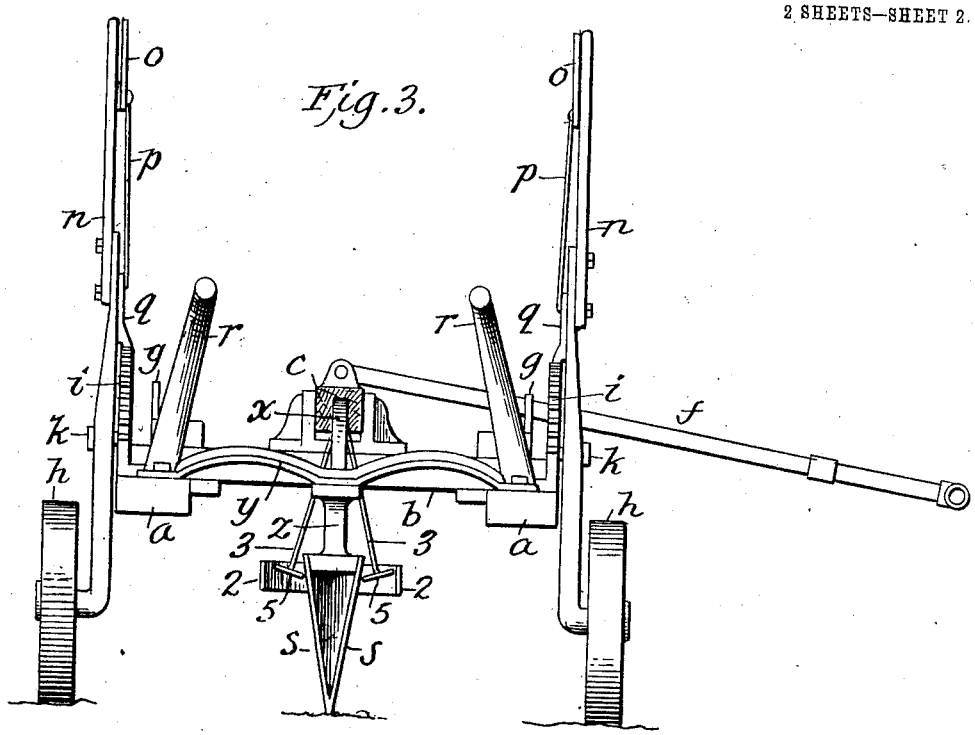
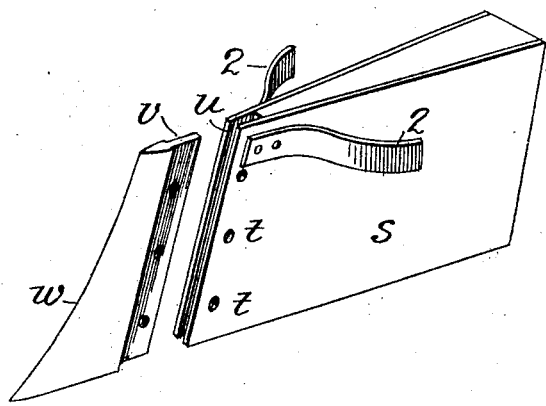
WITNESSES:
James F. Duhamel
M. Hamilton
Charles F. MacNair INVENTOR
BY his ATTORNEY James Hamilton

UNITED STATES PATENT OFFICE.

CHARLES F. MacNAIR, OF DANSVILLE, NEW YORK.

PLOW.

No. 832,989.      Specification of Letters Patent.      Patented Oct. 9, 1906.

Application filed October 19, 1905. Serial No. 283,361.

*To all whom it may concern:*

Be it known that I, CHARLES F. MACNAIR, a citizen of the United States, residing in Dansville, in the county of Livingston and State of New York, have invented certain new and useful Improvements in Plows, of which the following is a specification, reference being had to the accompanying drawings.

My invention relates to plows, and especially to trench-forming devices used for breaking the ground for the planting of nursery stock.

In setting nursery plants they are planted about ten inches deep and at a slight incline from the vertical in order to facilitate the work of budding and cultivating. It is absolutely necessary that this slight incline be in the same direction in every row—that is, if the first row is set with an incline to the south then every row in the lot must be set with an incline to the south. This is essential in order to prevent the trees inclining toward each other as they grow and to insure the space between the rows which is necessary for the passage of a horse and the cultivator to which he is hitched.

In my new plow the moldboards are both inclined at the same angle to the vertical and meet at the bottom and front in cutting edges. The moldboards being inclined, the furrow or trench cut by them will have the same inclination, and since both moldboards are inclined the plow is capable of use in passing in both directions across the lot or field, which is a decided advantage over those plows in which one of the moldboards is vertical and which can be used in only one direction, having to return idle or "carry furrow" in the other direction. A plow with both moldboards inclined is capable of doing twice as much work, at least, as a plow having one of its moldboards vertical.

In order that the incline of the trench may be maintained the same upon a hillside as upon the level, my new plow is provided with means whereby either of the wheels may be raised or lowered to change the inclination of the plow to suit the slope of the ground and to maintain the incline of the trench uniform. Means are also provided in my new plow for making the trench of any desired depth within ordinary working limits. Moreover, the plow is so constructed that the driver standing upon the footboards can instantly change the depth by stepping forward or backward, thus meeting the exigencies of the instant.

My new plow is fitted with an adjustable marker which may be thrown from one side to the other of the plow. In order to increase the life of the plow, it is made with a removable point which may be replaced by a new point when needed. It is found that the best steel points in certain soils, especially sandy soils, rapidly dull, and by making the point renewable much expense is saved. Between the plow proper and its carriage an arched attachment is provided. The arched form permits the passage of stones, sods, and stubble and prevents clogging.

Experience has taught that about one and one-half inches of soil is left loose at the top of the trench and that it is necessary to prevent this loose soil from falling back into the trench; further, that the soil at the top edge of the trench should be made firm. To accomplish these objects, the following devices are provided: To each of the moldboards is secured a projecting member, herein termed a "wing." These wings force back to a distance of about three inches from the edge of the trench the soil left loose by the cutter. In rear of these wings and adjustably secured to the plow-beam, one on each side thereof, are spring-steel followers, which press the soil around the top of the trench into a firm condition, and thereby prevent it from falling back into the trench.

Other features of my invention will be referred to hereinafter.

The object of my invention is to provide a plow of the class described which will make a furrow or trench having uniformly-inclined walls, which will form the top of the trench in such manner as to prevent the soil from falling back into the trench, which will be capable of adjustment in such manner as to vary the depth of the trench on the instant, and to make trenches of different depths, which will be capable of use upon a hillside equally well as upon a level field and in freshly-turned sod-land equally well as in well-fallowed land, which will turn a trench in both directions across the field, and which will be simple in construction, cheap in manufacture, and efficient in operation.

In the drawings illustrating the principle of my invention and the best mode now known to me of applying that principle, Figure 1 is a side elevation of my new plow.

Figure 2:
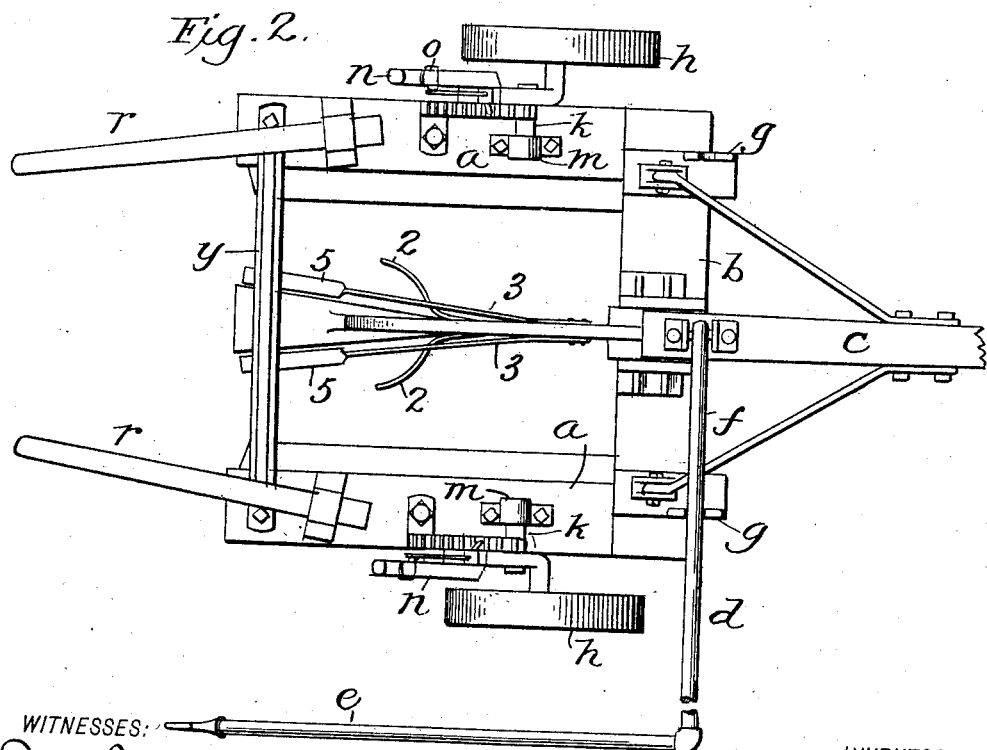

Fig. 2 is a plan view of the same. Fig. 3 is a rear view thereof, and Fig 4 is a detail in perspective of the trench-cutter.

The frame of the plow is made up of two side pieces $a$, hereinafter called "footboards," and a cross-piece $b$, hereinafter called the "front" board. To the front board is suitably secured the pole $c$, and pivoted upon the rear end of the pole $c$ is the marker $d$, comprising two rods secured at right angles to each other, the rod $e$ being capable of being turned about the rod $f$, as will be readily understood from an inspection of Figs. 1 and 2. At each end of the front board $b$ is a holder $g$, into which the rod $f$ falls and by which the marker is held. From the construction described and shown it will be obvious that the marker may be readily adjusted for use upon either side of the plow.

The plow is supported upon the wheels $h$ in the following manner: Upon each of the footboards $a$ and about midway thereof is mounted a toothed segment $i$, through the standard $j$ of which passes a shaft $k$, the inner end of which is journaled in the box $m$ and the outer end of which is fast to the lever $n$. It will be understood that this construction is the same upon each side of the plow. Each of the levers $n$ is provided with a thumb-latch $o$ at its upper end, and to the lower end of each of the thumb-latches $o$ is secured a rod $p$, which controls a pawl $q$, adapted to engage in the teeth of the toothed segment $i$. By moving the levers $n$ the distance of the frame from the ground may be varied, and by proper adjustment of the levers $n$ the frame may be suitably inclined. Moreover, the frame is susceptible of being oscillated about the shafts $k$ as axes to vary the depth of the trench on the instant by the driver stepping to the front or to the rear of the wheels while standing upon the footboards $a$. At the rear of each of the footboards $a$ is mounted a handle $r$.

The trench-former (shown in perspective in Fig. 4) has its side inclined slightly to the vertical, Fig. 3, and these sides, called "moldboards" herein, (and by some denominated "landsides,") meet at their bottom in a cutting edge which insures the plow staying in the ground, and converge toward the front, where they are formed with countersunk bolt-holes $t$. Into the narrow slot $u$ left between the front edges of the moldboards $s$ is fitted the tenon $v$ of the detachable point or cutter $w$. Bolts passed through the holes $t$ serve to secure the cutter $w$ in position. The trench-former is secured to the plow-beam $x$, which is in turn secured to the front board $b$, and extending transversely of the plow, with an end resting upon each of the footboards $a$, is an arched beam $y$, to the central part of which is secured a block $z$, which in turn is secured to the rear of the trench-former. At the front and near the top of each of the moldboards $s$ is mounted a wing 2, and these wings serve to push back from the top of the trench the loose soil to a distance of about three inches therefrom and to a depth of about one and one-half inches. To each side of the plow-beam $x$ is pivotally secured a rod 3, through which passes a bolt into the slot 4 in the plow-beam, and thereby permits the free end 5 of the rod 3 to be raised and lowered. The rod 3 is of spring-steel, which causes the follower 5, while yielding to the inequalities of the ground, to press firmly against the earth with which it comes into contact at the top of the trench and by sliding pressure to put the soil about the top of the trench into such a firm condition that it will not fall back into the trench.

My new plow has, among others, the following advantages: Since both the moldboards $s$ are equally inclined, it may be used in both directions across the field and will cut a trench of uniform inclination of walls in both directions. By proper adjustment of the levers $n$ the plow may be used upon a hillside to produce a trench of the same inclination of walls as it cuts upon the level. Again, by properly setting the levers $n$ the depth of the trench may be made of the desired magnitude within working limits. Further, by working the levers $n$ the plow may be made to turn corners easily. By stepping upon the footboards $a$ the plowman is able to swing the plow about the shafts $k$, and thereby to vary the depth of the trench upon the instant, as in many cases is necessary. The arched shape of the beam $y$ permits of the free passage of stones, sods, and stubble, and so prevents clogging of the plow. The front and bottom edges of the trench-former are sharp, and this tends to keep the plow in the ground. The detachable and renewable cutter $w$ makes the life of the plow longer than it would otherwise be. The marker $d$ being easily adjusted upon either side of the plow makes the speed with which the plow may be worked greater and the amount of work done, therefore, greater. The wings 2 and spring-steel followers 5 finish off the top of the trench, so that the soil is there left in a firm condition.

What I claim is—

1. A trench-former comprising two moldboards both of which are inclined to the vertical and which meet at their bottom to form a thin cutting edge.

2. A trench-former comprising two moldboards both of which are inclined to the vertical and which meet at their bottom to form a thin cutting edge and between the front edges of which is mounted a detachable cutter; and said detachable cutter.

3. A trench-former comprising cutting means and means for moving the loose soil from the top of trench and away from the edge thereof.

4. In a plow, the combination with trench-forming means of means for pressing the soil about the top of the trench into a firm condition.

5. In a plow, the combination with trench-forming means of yielding devices for making the soil firm around the top of the trench.

6. In a plow, the combination of a trench-former; devices projecting one from each side of said trench-former near the top thereof; a plow-beam; and yielding devices carried by said plow-beam in rear of said devices.

7. A plow made up of two side pieces connected by transverse beams to form a frame; a pair of toothed segments, one on each of said side pieces intermediate said transverse beams; a journal-box on each of said side pieces near said segments; a pair of levers, each of which is journaled in one of said journal-boxes; a wheel upon the lower end of each of said levers; a locking device carried by each of said levers for locking said lever to that one of said segments to which it is adjacent; and a trench-forming device secured to said frame; said frame being pivoted upon said levers to swing and thereby raise and lower the said device by the operators stepping to the front or rear of said side pieces.

8. A plow comprising the combination of a frame made up of two side pieces and a front and rear cross-beam connecting the same; said rear cross-beam being arched upwardly to allow of the passage of brush and the like; a trench-forming device connected to said rear cross-beam; a pair of levers journaled one in each of said side pieces, whereby said frame may be made to swing to raise or lower said device by the operators stepping on said side pieces in front or rear of the pivotal points of said levers; and wheels mounted upon said levers.

CHARLES F. MacNAIR.

Witnesses:
JAMES A. BAILEY,
FANLON B. GORHAM.